United States Patent [19]

Hvidsten

[11] 4,107,516

[45] Aug. 15, 1978

[54] PULSE COUNTING APPARATUS FOR MEASURING MECHANICAL MOVEMENT OF A MACHINE SUCH AS A MINING MACHINE

[75] Inventor: Jan Hagbert Hvidsten, Ashby-de-la-Zouch, England

[73] Assignee: Coal Industry (Patents) Limited, London, United Kingdom

[21] Appl. No.: 775,120

[22] Filed: Mar. 7, 1977

[30] Foreign Application Priority Data

Mar. 23, 1976 [GB] United Kingdom ............... 11622/76

[51] Int. Cl.² ............................................. G06M 3/04
[52] U.S. Cl. ............................ 235/92 FP; 235/92 MP; 235/92 V; 235/92 R
[58] Field of Search ............ 235/92 V, 92 PB, 92 MP, 235/92 PD, 92 PE, 92 FP, 103; 250/222 R, 224

[56] References Cited

U.S. PATENT DOCUMENTS

| | | | |
|---|---|---|---|
| 3,792,241 | 2/1974 | Sullivan | 235/92 V |
| 3,793,508 | 2/1974 | Maggi | 235/92 V |
| 3,843,871 | 10/1974 | Fujimaki et al. | 235/92 V |
| 3,843,883 | 10/1974 | De Vita et al. | 235/92 V |
| 3,946,219 | 3/1976 | Lucas | 235/92 FP |
| 3,982,107 | 9/1976 | Butler | 235/92 V |
| 4,005,409 | 1/1977 | Feuer | 235/92 FP |

*Primary Examiner*—Joseph M. Thesz
*Attorney, Agent, or Firm*—Stevens, Davis, Miller & Mosher

[57] ABSTRACT

Pulse Counter means adapted to determine the position of a mining machine including a rotary member. The pulse counter means includes an arrangement of phototransistors and photodiodes which is adapted to derive electrical pulse signals in response to movement of the rotary member therebetween. Circuitry in the form of logic gates and switching transistors is provided so that operational errors of the phototransistor and diodes are located.

The pulse counter means also includes a memory which is kept on by an internal battery when external power is removed so that the counted position is not lost when power failures occur.

11 Claims, 9 Drawing Figures

PULSE COUNTING APPARATUS FOR MEASURING MECHANICAL MOVEMENT OF A MACHINE SUCH AS A MINING MACHINE

This invention relates to electrical pulse counter means and to mining machines incorporating pulse counter means.

A mining machine includes a mechanical member which moves proportionally to movement of the mining machine.

Ojbects of the present invention are to measure movement of the mechanical member and thereby movement of the mining machine, thereby determining machine position.

A further object of the present invention is to provide a pulse counter means for measuring the movement of said member, which pulse counter means is able to continue functioning even when power to the mining machine is removed.

According to one aspect of the present invention electrical pulse counter means adapted to function in associated with a rotary mechanical member, an external power supply and an internal power source comprises light emitting diodes, phototransistors, the light emitting diodes and phototransistors being situated on axially opposite sides of the rotary mechanical member respectively, each phototransistor being controlled by a respective one of the light emitting diodes to derive electrical pulse signals in response to movement of the rotary mechanical member between the light emitting diodes and phototansistors, first means for detecting the sequence of and counting the derived electrical pulse signals and including a memory means for storing the counted number of electrical pulse signals and second means for switching off power from the internal power source to part of the pulse counter means including the light emitting diodes after external power to the pulse counter means is removed. Conveniently, the pulse counter means comprises a battery constituting the internal power source for powering the first means when external power is removed therefrom.

Preferably, the first means comprises gate means adapted to derive an eror indication signal unless an electrical signal is received from at least one of the phototransistors.

Advantageously, the first means comprises logic circuitry.

Advantageously, the first means includes a visual dispaly of the counted signal. Conveniently, the first means includes means for transmitting the counted number as an electrically coded signal.

Preferably, the first means includes switches for inserting a desired reference number into the memory means.

Conveniently, the visual display includes a liquid crystal display.

Advantageously, the second means comprises switching transistors.

Preferably, the second means includes a capacitor adapted to control time of actuation of the switching transistors.

The present invention also provides pulse counter means as defined above in combination with a mining machine including the rotary member.

An embodiment of the present invention will now be described, by way of example only, with reference to the accompanying drawings in which.

Figure 1:
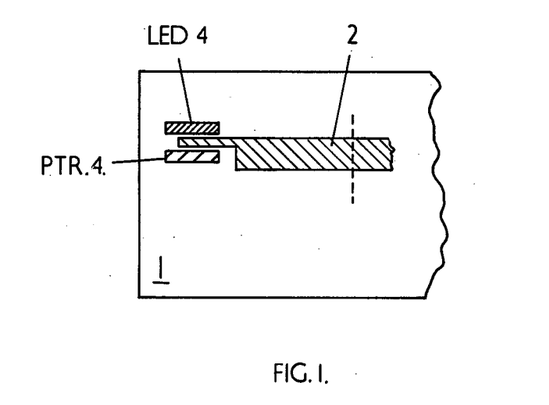
FIG. 1 is an incomplete partly sectioned view of a part of a mining machine.

Referring to FIG. 1 a mining machine is partly shown at 1. The mining machine incorporates a rotary mechanical member 2 which moves proportionally to linear motion of the mining machine. A light emitting diode and a phototransistor both of which are described more fully subsequently are indicted at LED4 and PTR4 respectively. The rotary mechanical member 2 is adapted to interrupt or allow passage of light between the diode LED4 and the photoansistor PTR4, dependent upon operational positions of the mechanical member. Further light emitting diodes and phototansistors (not shown in FIG. 1 but shown at LED5, LED6, PTR5, and PTR6 in FIG. 3) are arranged in a similar manner as described subsequently.

Figure 2:
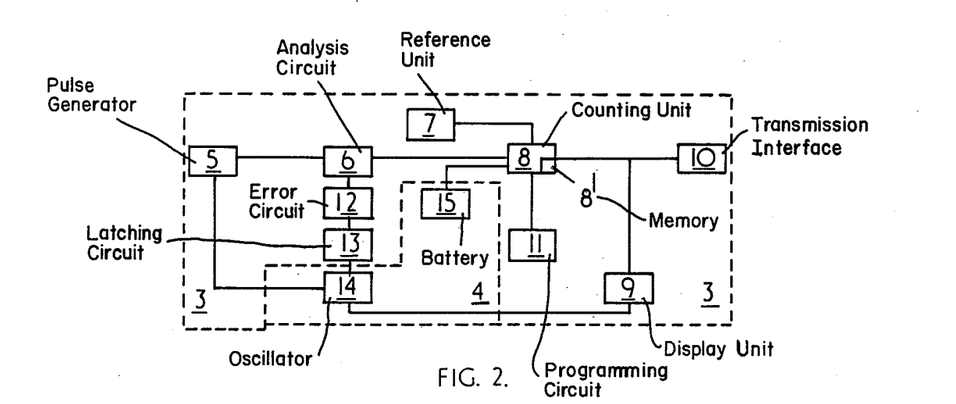
FIG. 2 is a block electrical circuit diagram.
Figure 4:
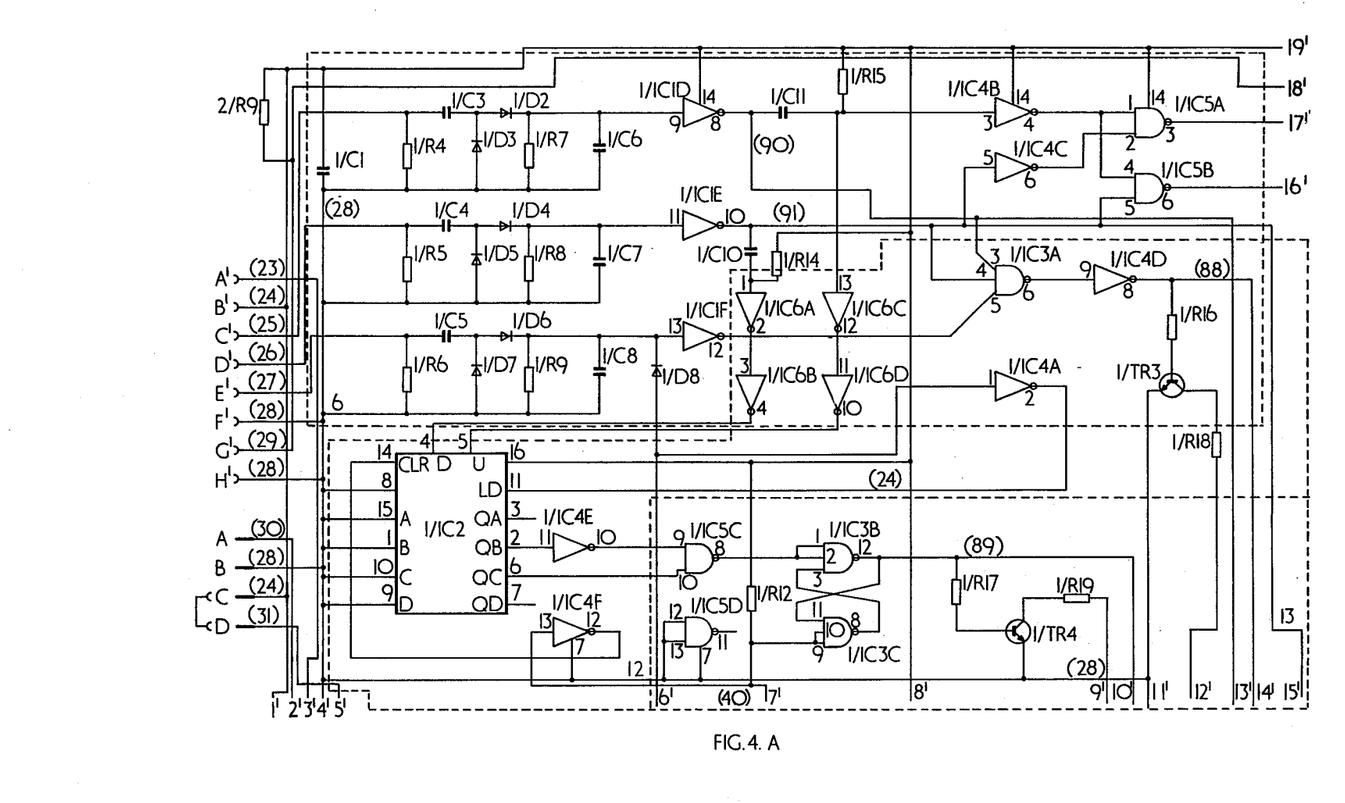
FIG. 4A is a detailed electrical circuit diagram of a second part of FIG. 2 and has connector lines 1' to 19' to similar numbered connector lines on the other Figures.
FIG. 4B is a detailed electrical circuit diagram of a third part of FIG. 2 and has connector lines 11' to 19' and 20' to 41' to similar number connector lines on the other Figures.
FIG. 4C is a detailed electrical circuit diagram of a fourth part of FIG. 2 and has connector lines 10', 13' to 15' and 26' to 57' to the other Figures.
FIG. 4D is a detailed electrical circuit diagram of a fifth part of FIG. 2 and has connector lines 1' to 6', 8', 1", 6" and 58' to the other Figures.
FIG. 4E is a detailed electrical circuit diagam of a sixth part of FIG. 2 and has connector lines 7', 9', 11', 12', 20' to 24' and 1" to the other Figures.
FIG. 4F is a detailed electrical circuit diagram of a seventh part of FIG. 2 and has connector lines 6", 1', 25' and 42' to 58' to the other Figures.

Referring now to FIG. 2, pulse counter means for use in a mine comprises a first means 3 including circuit 5 arranged to derive pulses indicative of operational positions of the mechanical member 2 (not shown in FIG. 2), an analysis circuit 6 arranged to decide from the pulses a direction of movement of the mechanical member, a reference unit 7 for ensuring counting of the pulses commences at an appropriate reference point, a counting unit 8 including a memory means 8' to count the pulses, a liquid crystal display unit 9 for displaying a number of pulses counted, a transmission interface 10 for transmitting the number to a suitable further transmission system (not shown), a manual programming or overriding circuit 11 to enable any desired reference number for the counting to be inserted, an error detection circuit 12, which received pulse from the analysis circuit 6 and gives an output to energise warning light emitting diodes and to trip a latching circuit 13 when an error in operation of the circuit 1 is occurring, and second means 4 including oscillator arrangement 14 for providing a driving signal to the circuit 5 and the liquid crystal display unit 9, a battery 15 and switching transistors (not shown but described in more detail at 11TR1, 11TR2 with reference to FIG. 4).

Figure 3:
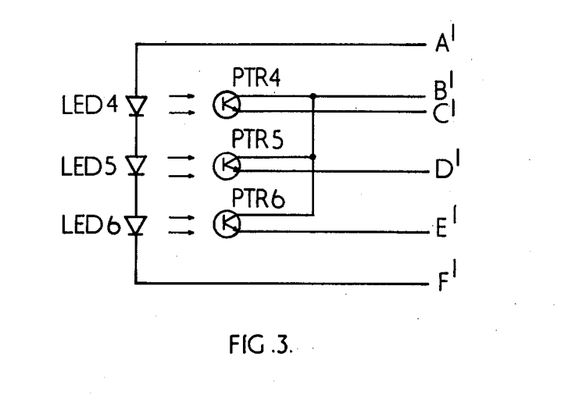
FIG. 3 is a detailed electrical circuit diagram of a part of FIG. 2.

Referring to FIG. 3, the circuit 5 for deriving signals indicative of the movement of the mechanical member comprises three light emitting diodes LED4, LED5 and LED6 and three phototransistors PTR4, PTR5 and PTR6. Each phototransistor is controlled by a respective light emitting diode. Phototransistor PTR4 is controlled by LED4 and is physically arranged as described previously with reference to FIG. 1. Phototransistors PTR5 and PTR6 are controlled respectively by LED5 and LED6 and not physically arranged in an analogous mutual juxtapoint to PTR4 and LED4. The mechanical member is arranged so that the phototransistor are sequentially exposed to their respective diodes as the member rotates. The diodes flash simultaneously in response to a signal from oscillator arrangement 14 (described in more detail subsequently) one or two of the phototransistors being shielded from its or their respective diode by the mechanical member.

The arrangement of phototransistors and light emitting diodes enables the direction of movement o the mechanical member to be determined, since the phototransistors are covered and exposed sequentially as the member moves and the sequence depends upon the direction of movement of the member.

The emitters, that is the outputs, of phototransistors PTR4, PTR5 and PTR6 are connected to terminals $C^1$ and $D^1$ and $E^1$ respectively.

Referring now to FIGS. 4A to 4F, it will be seen that terminals $C^1$, $D^1$, $E^1$ are three of the 12 terminals attached to the remainder of the electrical circuitry, the other terminals bein accounted for by $A^1$, $F^1$ for transmitting the driving signals to the light emitting diodes of FIGS. 1, 2 and 3; A, B for supplying external power to the circuitry; C, D which are linked together and through which power is supplied via terminal $B^1$, to the phototransistors; and $G^1$ and $H^1$ for resetting the counting circuit 8 in response to an incoming signal.

The incoming signals from terminals $C^1$, $D^1$ and $E^1$ are alternating signals comprising the oscillator driving signal or nothing which are converted to pulses suitable for actuating logic circuitry i.e. square wave signals by circuits, comprisng part of analysis circuit 6 comprising 1/R4, 1/R5, 1/R6, 1/C3, 1/C4, 1/C5, 1/D2, 1/D3, 1/D4, 1/D5, 1/D6, 1/D7, 1/R8, 1/R9, 1/C6, 1/C7 and 1/C8.

The incoming square wave signals from terminals $C^1$, $D^1$ and $E^1$ are fed to the remainder of analysis circuit 6, comprising integrated circuits 1/IC1D, 1/IC1E, 1/IC1F, 1/IC4B, 1/IC4C, 1/IC5A, 1/IC5B and 2/IC3A, 2/IC3B, 2/IC3C and 2/IC3D.

After analysis a proportion of the pulses are fed to counting unit 8 comprising integrated circuit counters 2/IC8, 2/IC/9, 2/IC10 and 2/IC11 where an output number signal, dependent upon the number of pulses counted in derived. The counting unit 8 retains a counted number in its memory 8' until a fresh input causes the number to be counted up.

The output number signal is then fed through high value resistors 3/R1, 3/R2 . . . 3/R20 (in this example 150 Kohms) to the transmission interface 10 comprising integrated circuits 3/IC2, 3/IC3, 3/IC4 and 3/IC5 which function as switches preparatory to being transmitted to a further transmission system (not shown).

The output number signal is also tapped for a display function in unit 9. For this function, integrated circuits 2/IC15, 2/IC14, 2/IC13 and 2/IC12 convert the output number signals into signals suitable for energising liquid crystals in a liquid crystal display LCD1, so that the output number can be displayed.

The integrated circuit counters 2/IC8, 2/IC9, 2/IC10, and 2/IC11 commence their counting operation from numbers supplied by reference unit 7 comprising dual in-line switches 2/IC4, 2/IC5, 2/IC6 and 2/IC7. The numbers correspond to reference numbers required during the operation of the mechanical member for a purpose such as calibration, for example to reset the counters at or near an extremity of the travel of the mining machine in the vicinity of an end of a mineral face. The resetting signal is fed into the circuitry through terminals $G^1$, $H^1$. Apparatus (not shown) for deriving the resetting signal may comprise a switch which is actuated for example when the mechanical member passes a magnet fixed in is path.

The reference numbers supplied by the dual in-line switches 2/IC4, 2/IC5, 2/IC6 and 2/IC7 may be contained in the switches, or the dual in-line switches may be manually bypassed and the integrated circuit counters controlled by circuit 11 comprising switches SW1, SW2, SW3 and SW4. Switch SW5 is operated to convey power to the switches SW1 to SW4. In thi way the counting unit 8 may be counted up by pulses analogous to those received from the phototransistors.

Integrated circuits NOR gates 2/IC1A, 2/IC1B, 2/IC1C, 2/IC1D, 2/IC2A, 2/IC2B, 2/IC2C and 2/IC2D in association with integrated circuit exclusive OR gates 2/IC3A, 2/IC3B, 2/IC3C and 2/IC3D convey a desired reference number from the switches to the integrated circuit counters.

The pulses from the analysis circuit 6 are also fed to error detection circuit 12 comprising integrated circuit counter 1/IC2 which feeds to the latching circuit 13 comprising integrated circuits 1/IC4E, 1/IC5C, 1/IC3B, 1/IC3C and transistor switch 1/TR4.

A first indication of error is given visually by a light emitting diode LED1. The diode is operated through transistor 1/TR3 which is controlled by integrated circuit inverter 1/IC4D, in conjunction with integrated circuit gate 1/IC3A. The light emitting diode LED1 is energised in response to a signal derived by NOR gate 1/IC3A, due to faulty functioning of invertors 1/IC1D, 1/IC1E, and 1/IC1F, or to faulty functioning of the external circuit connected through these integrated circuits.

For example, during operation of the mining machine it can happen that the cable to the light emitting diodes and phototransistors about the rotary member is cut. In this case, there will not be an input signal from any of the phototransistors PTR4, PTR5 or PTR6. Consequently, there will be a low input on each of inpus 3, 4, 5 of the NOR gate 1/IC3A. 1/IC3A will therefore have a high output which causes energisation of warning light emitting diode LED1 through transistor 1/TR3. General power failure is discussed in more detail later in the specification.

A driving signal for the liquid crystal display CLD1 is provided by integrated circuit oscillator 14 comprising 1/IC1B and 1/IC1C. The oscillator also provides a driving signal for the light emitting diodes LED4, LED5 and LED6 (FIG. 3). comprising circuit 5, through terminals $A^1$ and $F^1$.

A battery for powering parts of the circuitry is shown at 15 and will be mentioned in more detail subsequently.

Operation of the invention is now described with reference to all the figures and in operation the three pulse signals from the three separate phototransistors PTR4, PTR5 and PTR6 are analysed in two ways by the analysis circuit 6.

It will be appreciated that the movement of the rotary mechanical member 2 covers sequentially firstly PTR4 alone, PTR4 and PTR5 together, and PTR5 alone when moving in a first direction and PTR5 alone, PTR5 and PTR4 together, and PTR4 alone when moving in the opposite direction. Clearly, the sequence of electrical square wave signals derived from the electrical pulse signal of the phototransistors is dependent upon the direction of movement of the member.

The square wave signals from phototransistors PTR4 and PTR5, derived from pulses through terminals $C^1$ and $D^1$ respectively are analysed so that firstly the direction of movement of the mechanical member may be determined by the order in which the pulses from PTR4 and PTR5 reach the analysis circuit 6, and secondly the integrated circuit counters can count the pulses from PTR4 and PTR5.

Considering the analysis of direction performed by the circuit 6 in more detail, it will be seen that outputs of NAND gates 1/IC5A and 1/IC45B, through terminals 3, 6 respectively are connected to the terminals 5, 4 respectively of counter 2/IC8. The counter 2/IC8 and the other counters 2/IC9, 2/IC10 and 2/IC11 count in opposite directions dependent upon which of the terminals 5, 4 receives an input pulse. Consequently, signal inverters 1/IC1D, 1/IC4B and 1/IC1E, 1/IC4C connected to PTR4, PTR5 respectively are arranged such that one of NAND gates 1/IC5A derives a pulse, the one being dependent upon the sequence in which the pulses are transmitted from either or both of PTR4 and PTR5.

The second operation of the analysis circuit is to provide a pulse to terminals 5, 4 of integrated circuit counter 1/IC2 corresponding to pulses from the phototransistors PTR4, PTR5 respectively, such that the integrated circuit counter 1/IC2, alternatively counts between two levels, the controlling signals being derived from the phototransistors during normal operation. Amplifiers 1/IC6A, 1/IC6B and 1/IC6C, 1/IC6D provide suitable amplification of pulses from PTR4, PTR5 respectively.

In this way, during normal operation, the integrated circuit counter 1/IC2 will be at one of two levels. If, a fault develops in the operation of the pulse analyzing or external pulse generating equipment, the counter 1/IC2 counts continuously in one direction. Eventually a logic '0' will appear on pin 2 of the 1/IC2 simultaneously with a logic '1' on pin 6 of 1/IC2. Pin 2 is connected to signal invertor 1/IC4E. In consequence logic '0' apears on pin 8 of 1/IC5C.

In operation of logic '0' on pin 8 of NAND gate 1/IC5C causes the setting of the latch arrangement 13, comprising 1/IC3B, 1/IC3C which cannot be reset automatically. The latch arrangement ensures that an error cannot be overlooked.

A second visual external indication of error is given through light emitting diode LED2 which is controlled by transistor 1/TR4 from the output of the latch arrangement. Notice of the error is also transmitted to the further transmission system (not shown).

The latch 1/IC3B, 1/IC3C can be manually reset and the integrated circuit counter 1/IC2 set to one of the two levels by the use of switch SW6.

The operation of transistors 1/TR1 and 1/TR2 to such that when the main power supply to the apparatus through terminal A is switched on then power is supplied to the light emitting diodes of circuit 5 and error detection circuit 6.

However, should the power be removed due to power failure or other interruption then the transistor 1/TR2 is turned off, after a delay provided by a long time constant RC circuit, comprising resistor 1/R3 and capacitor 1/C2, so that power is removed from the light emitting diodes of the circuit 5.

In more detail, when external power to the circuitry is on, then the capacitor 1/C2 is charged and there is a high input to inverter 1/IC1A which therefore has a low output 2. Since the collector of transistor 1/TR1 is positive an alternating signal is provided to power the liquid crystal display LCD1 and to energise the light emitting dioes LED4, LED5, LED6.

When however the external power is removed, the capacitor 1/C2 discharges after approximately 20 minutes and there is then a high output on inverter 1/IC1A, which turns off transistor 1/TR2 thereby removing the driving signal for the display LED1 and the light emitting diodes LED4, LED5 and LED6. The high output of 1/IC1A is also transmitted to integrated circuit 1/IC1F, so that the latter has a low output.

Consequently, the NAND gate 1/IC3A continues to have a low output and so does not turn on the transistor 1/TR3 and in consequence the warning light emitting diode LED1 mentioned previously is not energised. A discharge time of the capacitor is provided so that the battery can continue to power the whole pulse counter means until the mining machine reaches a steady state. For example, the mining machine may continue to move temporarily after the cable is cut, but the movement will be recorded for the discharge time.

However, the counting circuitry and memory continues to be powered from the battery 15 even after the discharge so that memory of machine position is retained.

Integrated circuits 1/IC6E, 1/IC6F, 1/IC5D are provided for stabilising signals in the circuits of the invention.

The integrated circuits comprising the present invention consume as little power, as is possible consistent with their correct operation, the current being of the order of microamps, and consequently will continue in operation until the capaitor C2 discharges even should the main power supply be turned off. The liquid crystal display is switched off, but power to the circuiry is provided by the internal battery and a counted number will be retained in the counter memory for weeks as described above.

It will be appreciated that a plurality of pulse counters adapted to count the distance moved by mechanical members in a plurality of separate planes may be provided, so that the position of the mining machine may be determined with respect to any fixed reference.

The pulse counter means could also be attached to mine bunkers.

From the above description, it can be seen that the present invention provides pulse counter means suitable for measuring movement particularly of a mining machine, which is able to keep functioning at least in part when power to the mining machine is removed.

I claim:
1. Pulse counting apparatus for use with a rotary mechanical member, said apparatus receiving electrical power from an external power supply, comrising:
an internal battery;
a plurality of light emitting diodes coupled across said external power supply and said internal battery;
a plurality of phototransistors, said light emitting diodes and said phototransistors being situated on opposite sides of said rotary mechanical member, each phototransistor being controlled by a respective one of said light emitting diodes to generate electrical pulse signals in response to movement of said rotary mechanical member between said diodes and phototransistors;

first means comprising
- an analysis circuit for detecting the sequence of the electrical pulse signals generaed by said phototransistors, and
- a counting unit for counting the number of electrical pulse signals generated by said phototransistors, said counting unit including a memory for storing the counted number of electrical pulse signals; and second means including a delay circuit for disconnecting a portion of said pulse counting apparatus including said light emitting diodes from said internal battery after said external power supply has been removed from said pulse counting apparatus and only after a predetermined period of time has elapsed.

2. Pulse counting apparatus as claimed in claim 1 wherein said internal battery powers said first means when external power is removed therefrom.

3. Pulse counting apparatus as claimed in claim 1 wherein said first means comprises gate means for generating an error indication signal in the absence of an electrical signal from at least one of said phototransistors.

4. Pulse counter means as claimed in claim 3, wherein said analysis circuit comprise logic circuitry.

5. Pulse counter means as claimed in claim 4, wherein the first means includes a visual display of the counted signal.

6. Pulse counter means as claimed in claim 5, wherein the first means includes means for transmitting the counted number as an electrically coded signal.

7. Pulse counter means as claimed in claim 6 wherein the first means includes switches for inserting a desired reference number into the memory means.

8. Pulse counter means as claimed in claim 5 wherein the visual display includes a liquid crystal display.

9. Pulse counter means as claimed in claim 1 wherein said second means further comprises switching transistors interposed between said delay circuit and said light emitting diodes.

10. Pulse counter means as claimed in claim 9 wherein the second means includes a capacitor adapted to control time of actuation of the switching transistors.

11. A mining machine for use with an external power supply comprising:
a rotary mechanical member, and
pulse counting apparatus including
- an internal battery;
- a plurality of light emitting diodes coupled across said external power supply and said internal battery;
- a plurality of phototransistors, said light emitting diodes and said phototransistors being situated on opposite sides of said rotary mechanical member, each phototransistor being controlled by a respective one of said light emitting diodes to generate electrical pulse signals in response to movement of said rotary mechanical member between said diodes and phototransistors;

first means comprising
- an analysis circuit for detecting the sequence of the electrical pulse signals generated by said phototransistors, and
- a counting unit for counting the number of electrical pulse signals generated by said phototransistors, said counting unit including a memory for storing the counted number of electrical pulse signals; and second means including a delay circuit for disconnecting a portion of said pulse counting apparatus including said light emitting diodes from said internal battery after said external power suply has been removed from said pulse counting apparatus and only after a predetermined period of time has elapsed.

* * * * *